United States Patent
Park (10) Patent No.: US 10,117,053 B2
(45) Date of Patent: Oct. 30, 2018

(54) VEHICLE, SERVER, AND SYSTEM INCLUDING THE SAME

(71) Applicants: Hyundai Motor Company, Seoul (KR); Kia Motors Corporation, Seoul (KR)

(72) Inventor: Jongpil Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/597,280

(22) Filed: May 17, 2017

(65) Prior Publication Data

US 2018/0184245 A1   Jun. 28, 2018

(30) Foreign Application Priority Data

Dec. 22, 2016   (KR) .................. 10-2016-0176224

(51) Int. Cl.
  *H04W 24/00*   (2009.01)
  *H04W 4/02*    (2018.01)
  *H04W 84/00*   (2009.01)
  *H04W 88/04*   (2009.01)

(52) U.S. Cl.
  CPC .......... *H04W 4/023* (2013.01); *H04W 84/005* (2013.01); *H04W 88/04* (2013.01)

(58) Field of Classification Search
  USPC .................................. 340/902, 992; 342/357
  See application file for complete search history.

(56) References Cited

U.S. PATENT DOCUMENTS

| | | | |
|---|---|---|---|
| 9,735,976 B2 * | 8/2017 | Stahlin | H04L 12/189 |
| 2014/0139354 A1 * | 5/2014 | Miyazaki | B60L 11/1816 |
| | | | 340/902 |
| 2017/0184726 A1 * | 6/2017 | Lee | G01S 19/51 |
| 2017/0337816 A1 * | 11/2017 | Lu | G08G 1/166 |

FOREIGN PATENT DOCUMENTS

CN   105869230 A  *  8/2016

* cited by examiner

*Primary Examiner* — David Q Nguyen
(74) *Attorney, Agent, or Firm* — Mintz Levin Cohn Ferris Glovsky and Popeo, P.C.; Peter F. Corless

(57) ABSTRACT

A server includes: a receiver configured to receive information, from a first vehicle, indicating that a third vehicle is unable to communicate with the server; and a transmitter configured to transmit a message, to a second vehicle that is able to sense the third vehicle, indicating that it is unnecessary to transmit information about the third vehicle, in response to the receiver receiving the information indicating that the third vehicle is unable to communicate with the server.

16 Claims, 6 Drawing Sheets

VEHICLE, SERVER, AND SYSTEM INCLUDING THE SAME

CROSS-REFERENCE TO RELATED APPLICATION

This application claims the benefit of the priority of Korean Patent Application No. 10-2016-0176224, filed on Dec. 22, 2016 in the Korean Intellectual Property Office, the disclosure of which is incorporated herein by reference as if fully set forth herein.

BACKGROUND

1. Technical Field

Embodiments of the present disclosure relate generally to a vehicle, a server, and system including the same and, more particularly, to a system for preventing transmission of redundant information by communicating with vehicles that can collect information about another vehicle which cannot communicate with a server.

2. Description of the Related Art

The term "telematics" is a compound word of telecommunication and informatics. It is defined as a next-generation information providing service for vehicles which combines the information technology (IT) industry and the automotive industry.

Telematics services can utilize wireless communication technology and Global Positioning System (GPS) technology to provide various services relating to, for example, traffic and driving information, emergency management information, a remote vehicle diagnoses, the Internet, etc. Recently, telematics have also been applied to implement autonomous driving technologies.

SUMMARY

It is an aspect of the present disclosure to provide a system capable of transmitting a message to vehicles that can collect information about another vehicle indicating that it is unnecessary to transmit information about the other vehicle, when information is received from a server indicating that the other vehicle cannot communicate with the server, thereby preventing transmission of redundant information.

Additional aspects of the disclosure will be set forth in part in the description which follows and, in part, will be apparent from the description, or may be learned by practice of the disclosure.

In accordance with embodiments of the present disclosure, a server includes: a receiver configured to receive information, from a first vehicle, indicating that a third vehicle is unable to communicate with the server; and a transmitter configured to transmit a message, to a second vehicle that is able to sense the third vehicle, indicating that it is unnecessary to transmit information about the third vehicle, in response to the receiver receiving the information indicating that the third vehicle is unable to communicate with the server.

The server may further include a controller configured to detect the second vehicle around the third vehicle based on position information of the third vehicle transmitted from the first vehicle and to control the transmitter to transmit the message to the second vehicle.

The controller may be further configured to store information about a sensing range of a sensor of the first vehicle and information about a sensing range of a sensor of the second vehicle.

Furthermore, in accordance with embodiments of the present disclosure, a system includes: a server including a receiver and a transmitter; a first vehicle configured to sense a third vehicle that is unable to communicate with the server and to transmit information, to the server, indicating that the third vehicle is unable to communicate with the server; and a second vehicle configured to sense the third vehicle. The server is configured to transmit a message, to the second vehicle, indicating that it is unnecessary to transmit information about the third vehicle, in response to the server receiving the information indicating that the third vehicle is unable to communicate with the server, and the second vehicle is further configured to prevent sensing information about the third vehicle from being transmitted to the server in response to receiving the message from the server.

The first vehicle may be further configured to transmit a message, to the second vehicle, indicating that the information indicating that third vehicle is unable to communicate with the server has been transmitted to the server.

When the information transmitted from the first vehicle is received at the server, the second vehicle may be further configured to prevent the sensing information about the third vehicle from being transmitted to the server.

The server may be further configured to detect the second vehicle around the third vehicle based on position information of the third vehicle transmitted from the first vehicle.

Each of the first vehicle and the second vehicle may include a sensor configured to sense the third vehicle and to acquire information about the first vehicle or the second vehicle in which the sensor is included.

The sensor may include at least one of a distance sensor, an image sensor, a speed sensor, and a Global Positioning System (GPS) apparatus.

Each of the first vehicle and the second vehicle may include a communication portion configured to perform communication with the server and Vehicle-to-Vehicle (V2V) communication.

Furthermore, in accordance with embodiments of the present disclosure, a system includes: a first vehicle configured to sense a third vehicle that is unable to communicate with a server, to transmit information about the third vehicle to the server, and to transmit a message indicating that the information about the third vehicle has been transmitted to the server; and a second vehicle configured to sense the third vehicle, to receive the message transmitted from the first vehicle, and to prevent sensing information about the third vehicle from being transmitted to the server in response to receiving the message from the first vehicle.

The system may further include a server configured to transmit a message, to the second vehicle, indicating that it is unnecessary to transmit information about the third vehicle in response to receiving the information about the third vehicle from the first vehicle.

The second vehicle may be further configured to prevent the sensing information about the third vehicle from being transmitted to the server in response to receiving the message from the server.

The server may be further configured to detect the second vehicle around the third vehicle based on position information of the third vehicle transmitted from the first vehicle.

Each of the first vehicle and the second vehicle may include a sensor configured to detect the other vehicle and to acquire information about the first vehicle or the second vehicle in which the sensor is included.

Each of the first vehicle and the second vehicle may include a communication portion configured to perform communication with the server and Vehicle-to-Vehicle (V2V) communication.

Furthermore, in accordance with embodiments of the present disclosure, a vehicle includes: a sensor configured to sense another vehicle that is unable to communicate with a server and to acquire information about the vehicle; a communication portion configured to perform communication with the server and Vehicle-to-Vehicle (V2V) communication and to receive a message indicating that it is unnecessary to transmit information about the other vehicle from the server; and a controller configured to control the communication portion to transmit information about the other vehicle to the server when the other vehicle is sensed by the sensor, and to control the communication portion to prevent the information about the other vehicle from being transmitted to the server when the message indicating that it is unnecessary to transmit information about the other vehicle is received from the server through the communication portion.

When the other vehicle is sensed by the sensor, the controller may be further configured to control the communication portion to transmit a message, to a vehicle that is able to sense the other vehicle, indicating that the information about the other vehicle has been transmitted to the server.

When a message indicating that the information about the other vehicle has been transmitted to the server is received by the communication portion from a vehicle that is able to sense the other vehicle, the controller may be further configured to control the communication portion to prevent the information about the other vehicle from being transmitted to the server.

BRIEF DESCRIPTION OF THE DRAWINGS

These and/or other aspects of the disclosure will become apparent and more readily appreciated from the following description of the embodiments, taken in conjunction with the accompanying drawings of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment

DETAILED DESCRIPTION OF THE EMBODIMENTS

The detailed description describes the technical principle of the present disclosure and discloses embodiments, in order to clarify the scope of the present disclosure and to enable one of ordinary skill in the art to embody the present disclosure. The embodiments disclosed in this specification may be implemented in various ways.

Like numbers refer to like elements throughout this specification. Reference numerals used in operations are provided for convenience of description, without describing the order of the operations, and the operations can be executed in a different order from the stated order unless a specific order is definitely specified in the context.

This specification does not describe all components of the embodiments, and general information in the technical field to which the present disclosure belongs or overlapping information between the embodiments will not be described. The terms "part" and "portion", as used herein, may be implemented as software or hardware, and according to embodiments, a plurality of "parts" or "portions" may be implemented as a single component, or a single "part" or "portion" may include a plurality of components.

Also, it will be understood that when the terms "includes," "comprises," "including," and/or "comprising," when used in this specification, specify the presence of a stated component, but do not preclude the presence or addition of one or more other components. It is to be understood that the singular forms "a," "an," and "the" include plural referents unless the context clearly dictates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described with reference to the accompanying drawings.

Figure 1:
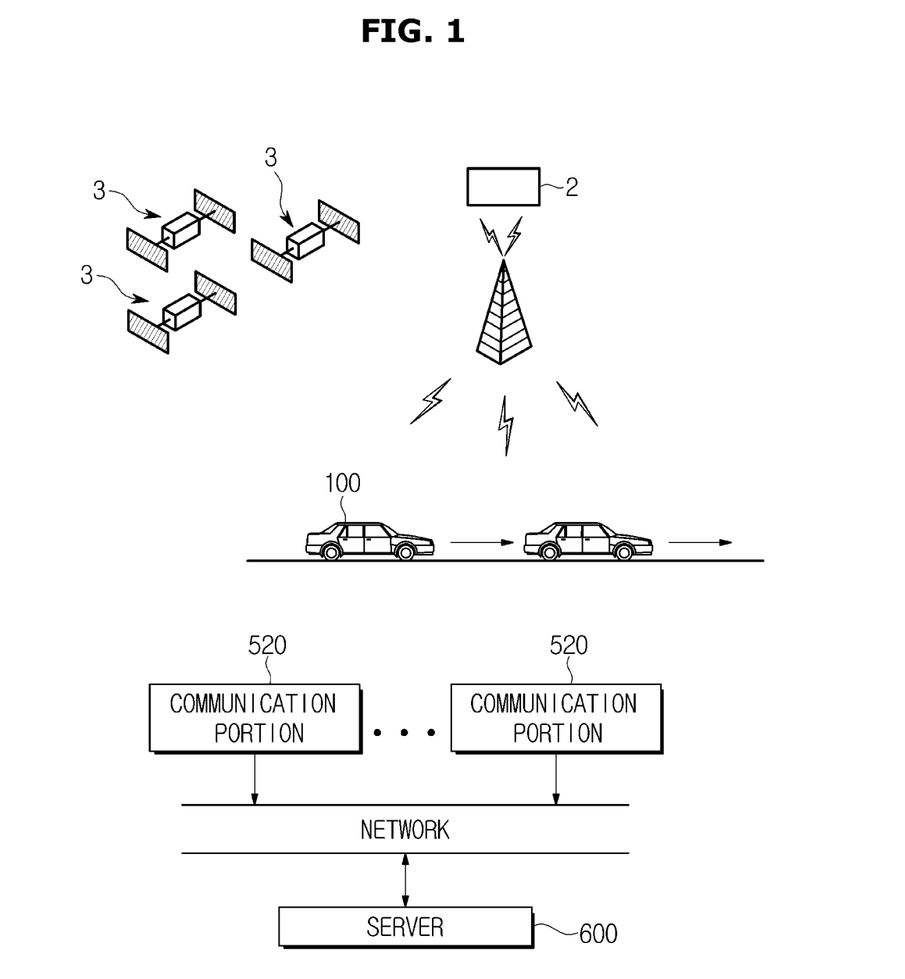
FIG. 1 shows a configuration of telematics system.

FIG. 1 shows a configuration of telematics system.

As shown in FIG. 1, telematics system according to embodiments of the present disclosure may include a communication portion 520 included in a vehicle 100, and a server 600 included in a telematics center 2.

The communication portion 520 may be installed in the vehicle 100 to communicate with the server 600 through a network. The communication portion 520 may be installed in the vehicle 100 as described above, or may be implemented as one of various terminals that can communicate with the server 600 although it is not installed in the vehicle 100. For example, the communication portion 520 may be implemented as a computer, a mobile terminal, or the like that can connect to the server 600 through the network. Herein, the computer may include, for example, a notebook computer, a desktop computer, a laptop computer, a tablet PC, a slate PC, and the like, in which a Web browser is installed. The mobile terminal, which is a wireless communication device ensuring portability and mobility, may include all kinds of handheld-based wireless communication devices, such as, for example, Personal Communication System (PCS), Global System for Mobile Communications (GSM), Personal Digital Cellular (PDC), Personal Handyphone System (PHS), Personal Digital Assistant (PDA), an International Mobile Telecommunication-2000 (IMT-2000), Code Division Multiple Access-2000 (CDMA-2000), W-Code Division Multiple Access (W-CDMA), or Wireless Broadband Internet (WiBro) terminal, a smart phone, and the like.

The communication portion 520 may include a communication module to communicate with the server 600, as described above, and the communication module may include one or more components. For example, the communication portion 520 may include a wireless communication module, and may further include at least one of a short-range communication module and a wired communication module. The wireless communication module may include wireless communication modules supporting various wireless communication methods, such as GSM, CDMA, W-CDMA, Time Division Multiple Access (TDMA), Long Term Evolution (LTE), and the like, as well as a Wireless-Fidelity (Wi-Fi) module and a WiBro module.

The wireless communication module may include a wireless communication interface including a communication port to connect a controller to the network, a transmitter to transmit signals for providing a telematics service, and a receiver to receive signals related to provision of the telematics service. Also, the wireless communication module may further include a signal conversion module to modulate a digital control signal output from the controller through the wireless communication interface into an analog wireless signal, and to demodulate an analog wireless signal received through the wireless communication interface into a digital control signal, under the control of the controller. The controller may include memory to store algorithms for controlling the operations of components of the communication portion 520 and data in the form of programs, and a processor to perform the above-described operation using the data stored in the memory. The memory and processor may be implemented as separate chips or as a single chip. The controller may be provided outside the communication portion 520 to control the overall configurations of the vehicle 100, or the controller may be included in the communication portion 520.

The short-range communication module may include various kinds of short-range communication modules, such as a Bluetooth module, an infrared communication module, a Radio Frequency Identification (RFID) communication module, a Wireless Local Access Network (WLAN) communication module, a Near Field Communication (NFC) module, a Zigbee communication module, and the like, which transmit/receive signals through a wireless communication network at a short range. The wired communication module may include various cable communication modules, such as a Universal Serial Bus (USB), a High Definition Multimedia Interface (HDMI), a Digital Visual Interface (DVI), and the like, as well as various kinds of wired communication modules, such as a Controller Area Network (CAN) communication module, a Local Area Network (LAN) module, a Wide Area Network (WAN) module, a Value Added Network (VAN) module, and the like.

Meanwhile, the communication portion 520 may receive Global Positioning System (GPS) signals from at least three GPS satellites 3, and calculate the current position of the vehicle 100 based on the GPS signals and map data. Also, the communication portion 520 may transmit, if a route from the current position of the vehicle 100 to a destination is set, position information of the vehicle 100 on the map to the server 600. Also, the communication portion 520 may transmit driving images of the vehicle 100 photographed by a black box or another photographing device, information about the surroundings of the vehicle 100 sensed by a sensor, and driving images of the vehicle 100 stored in a storage device, to the server 600. As described above, the communication portion 520 may transmit various data related to the vehicle 100 to the server 600.

The storage device may be included in the communication portion 520, or included in the vehicle 100 although it is not included in the communication portion 520. Also, the storage device may be external memory not included in the vehicle 100. The storage device may be implemented as at least one of a non-volatile memory device (e.g., a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium, such as Hard Disk Drive (HDD) and Compact Disc Read Only Memory (CD-ROM), although not limited to these. The storage device may be memory implemented as a separate chip from the processor described above in regard of the controller, or the storage device and the processor may be integrated into a single chip.

The server 600 may receive various data related to the vehicle 100, such as driving images of the vehicle 100 or information about the surroundings of the vehicle 100, from the communication portion 520 of the vehicle 100, and store the received data. Also, the server 600 may receive signals related to execution of a specific telematics service, and provide the telematics service related to the received signals.

Meanwhile, other vehicles (so-called "connected vehicles"), like the above-described vehicle 100, which can communicate with the server 600, may collect various information for autonomous driving, and transmit the collected information to the server 600. The server 600 may collect and process a large amount of data transmitted from the vehicles to use the data as information for autonomous driving. However, in many cases, the large amount of data transmitted to the server 600 includes redundant data about the same object. If the resources of the server 600 or the network are consumed by processing or transmission/reception of the redundant data, the efficiency of data processing or transmission/reception may deteriorate. Upon autonomous driving of the connected vehicles, vehicles (so-called "non-connected vehicles") that cannot communicate with the server 600 may be risk factors to the vehicles performing autonomous driving. Herein, the non-connected vehicles (for example, a vehicle C3 of FIGS. 5 and 6) may include vehicles that cannot share data with the server 600 or other vehicles, or that cannot be controlled by the server 600, since they cannot communicate with the server 600 or the other vehicles. Accordingly, the connected vehicles may need to collect information about the non-connected vehicle C3, and transmit the information about the non-connected vehicle C3 to the server 600. However, this may result in an increase of data amount, which leads to the deterioration of data processing or transmission/reception efficiency, as described above.

Accordingly, embodiments of the present disclosure may provide telematics system capable of limiting transmission of redundant data about a non-connected vehicle. Hereinafter, embodiments of the present disclosure will be described in detail with reference to FIGS. 2 to 6.

Figure 2:
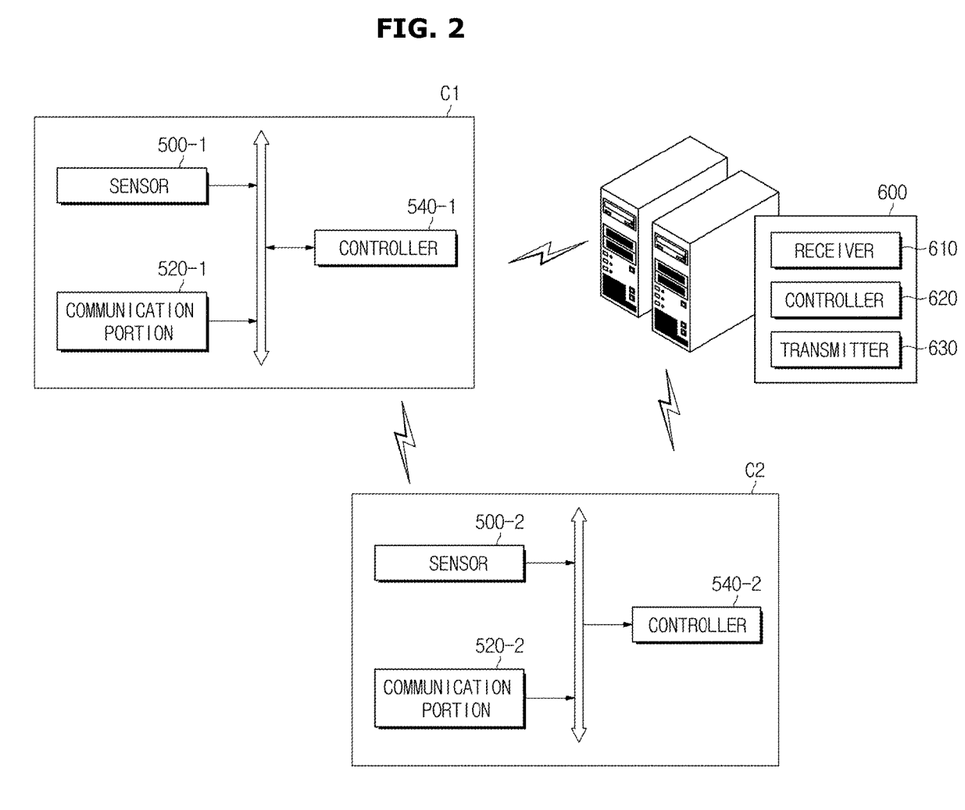
FIG. 2 shows telematics system according to embodiments of the present disclosure.
Figure 3:
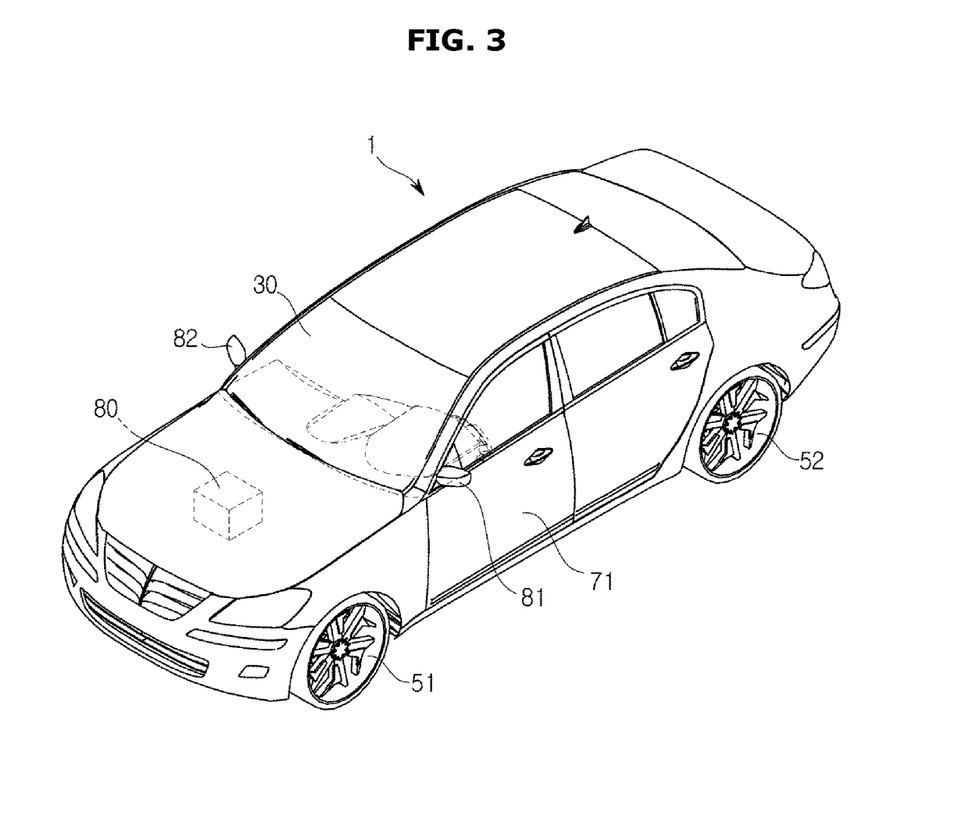
FIG. 3 shows the outer appearance of a vehicle according to embodiments of the present disclosure.
Figure 4:
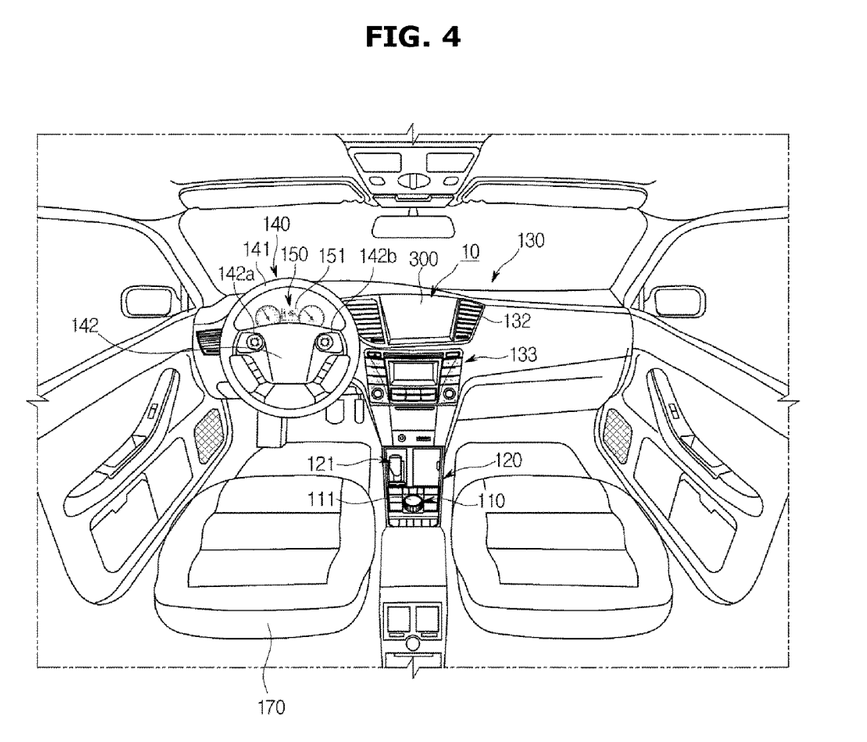
FIG. 4 shows the interior of a vehicle according to embodiments of the present disclosure.
Figure 5:
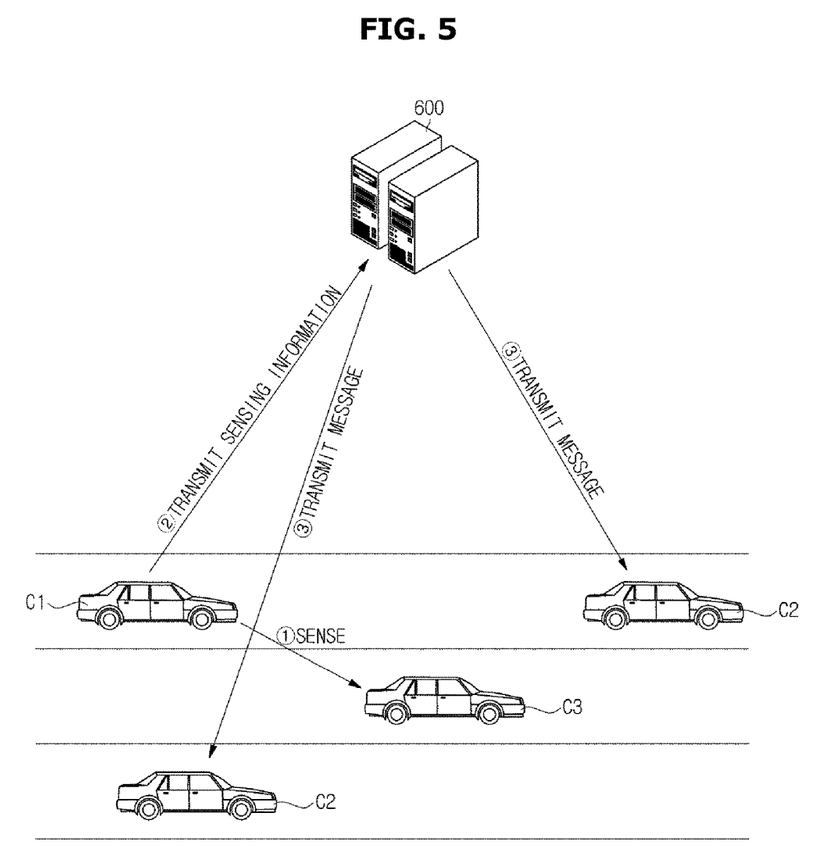
FIGS. 5 and 6 are views for conceptually describing information transmission between a server and a vehicle of telematics system according to embodiments of the present disclosure.
Figure 6:
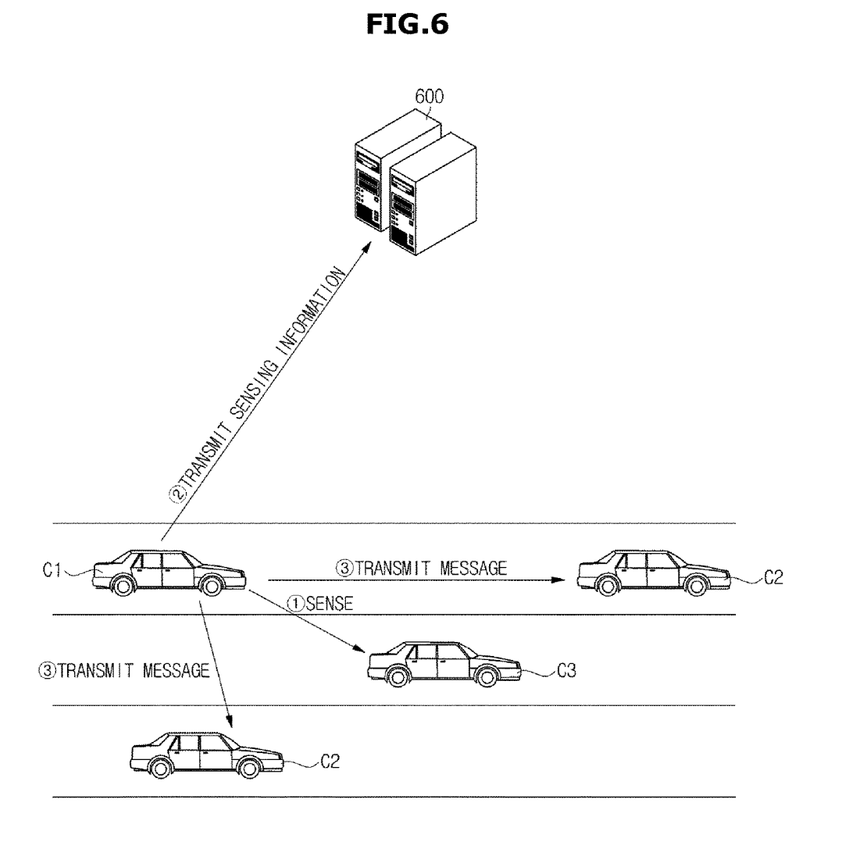

FIG. 2 shows telematics system according to embodiments of the present disclosure. FIG. 3 shows the exterior of a vehicle according to embodiments of the present disclosure, and FIG. 4 shows the interior of a vehicle according to embodiments of the present disclosure. FIGS. 5 and 6 are views for conceptually describing information transmission between a server and a vehicle of telematics system according to embodiments of the present disclosure.

Referring first to FIG. 2, telematics system according to embodiments of the present disclosure may include a first vehicle C1 and a second vehicle C2 that can communicate with the server 600, and the server 600 that can receive information about vehicles that cannot communicate with the server 100, through communication with vehicles.

The first vehicle C1 and the second vehicle C2 may be terms used to distinguish between a vehicle that has transmitted sensing information about a non-connected vehicle C3 (i.e., "third vehicle") to the server 600 and a vehicle that has not transmitted information about the non-connected vehicle C3 to the server 600. The first vehicle C1 and the second vehicle C2 may have the same configuration.

First, the external and internal configurations of a vehicle will be described with reference to FIGS. 3 and 4, below. It should be understood that the external and internal configurations shown in FIGS. 3 and 4 and described herein are provided merely for demonstration purposes, and thus does not limit the scope of the present disclosure and claims.

Referring to FIG. 3, the vehicle 100 according to embodiments of the present disclosure may include a main body 1 forming the outer appearance of the vehicle 100, wheels 51 and 52 to move the vehicle 100, a driving apparatus 80 to rotate the wheels 51 and 52, doors 71 to shield the interior of the vehicle 100 from the outside, a front glass 30 to provide a driver inside the vehicle 100 with a front view of the vehicle 100, and side-view mirrors 81 and 82 to provide the driver with rear views of the vehicle 100.

The wheels 51 and 52 may include a plurality of front wheels 51 provided in the front portion of the vehicle 100, and a plurality of rear wheels 52 provided in the rear portion of the vehicle 100.

The driving apparatus 80 may provide rotatory power to the front wheels 51 or the rear wheels 52 so that the main body 1 moves forward or backward. The driving apparatus 80 may include an engine to burn fossil fuel to produce rotatory power, or a motor to receive power from a battery or a fuel cell to produce rotatory power. If the driving apparatus 80 includes a motor, the driving apparatus 80 may include an inverter for controlling the rotation of the motor.

The doors 71 may be rotatably provided to the left and right of the main body 1 to allow the driver to open one of them and get into the vehicle 100. Also, the doors 71 may shield the interior of the vehicle 100 from the outside when all of them close.

The front glass 30, which is also called a windshield glass, may be provided in the upper, front part of the main body 1 to allow the driver inside the vehicle 100 to acquire a front view of the vehicle 100. Also, the side-view mirrors 81 and 82 may include a left side-view mirror 81 provided to the left of the main body 1 and a right side-view mirror 82 provided to the right of the main body 1 to allow the driver inside the vehicle 100 to be able to see side and rear situations of the vehicle 100 with his/her eyes.

In addition, the vehicle 100 may include various kinds of sensors for sensing an obstacle, etc. around the vehicle 100 to help the driver recognize a situation around the vehicle 100. Also, the vehicle 100 may include various kinds of sensors for sensing driving information of the vehicle 100, such as the speed of the vehicle 100. For example, the vehicle 100 may include a distance sensor for acquiring information about the surroundings of the vehicle 100, an image sensor, a speed sensor for sensing the speed of the vehicle 100 or another vehicle, and a GPS apparatus for sensing the position of the vehicle 100. However, the sensors included in the vehicle 100 are not limited to the above-mentioned examples, and the vehicle 100 may include other various well-known sensors.

As shown in FIG. 4, the vehicle 100 may include a dashboard in which a gear box 120, a center fascia 130, a steering wheel 140, an instrument panel 150, etc. are installed.

In the gear box 120, a gear lever 121 for shifting gears may be installed. Also, as shown in FIG. 4, the gear box 120 may include a dial manipulator 111 configured to enable a user to control execution of the functions of navigation system 10 or multimedia system including audio system 133 or the main functions of the vehicle, and an input unit 110 including various buttons. In the center fascia 130, an air conditioner 132, the audio system 133, and the navigation system 10 may be installed.

The air conditioner 132 may adjust the temperature, humidity, air quality, and flow of air inside the vehicle 100 to maintain the inside of the vehicle 100 pleasant. The air conditioner 132 may be installed in the center fascia 130, and may include at least one vent for discharging air. In the center fascia 130, at least one button or dial for controlling the air conditioner 132, etc. may be provided. A user, for example, a driver can use the button or dial provided on the center fascia 130 to control the air conditioner 132 of the vehicle. Also, the user can control the air conditioner 132 through the buttons of the input unit 110 or the dial manipulator 111 installed in the gear box 120.

In the center fascia 130, the navigation system 10 may be installed. The navigation system 10 may be embedded into the center fascia 130 of the vehicle. According to embodiments of the present disclosure, in the center fascia 130, an input unit for controlling the navigation system 10 may be installed. In addition, or in the alternative, the input unit of the navigation system 10 may be installed at another location, instead of the center fascia 130. For example, the input unit of the navigation system 10 may be disposed around a display unit 300 of the navigation system 10. According to still another example, the input unit of the navigation system 10 may be disposed in the gear box 120.

The steering wheel 140 may be used to adjust a driving direction of the vehicle 100, and may include a rim 141 that is gripped by a driver, and a spoke 142 connected to a steering apparatus of the vehicle 100 and connecting the rim 141 to a hub of a rotation shaft for steering. The spoke 142 may include manipulators 142a and 142b for controlling various kinds of devices (for example, the audio system) installed in the vehicle 100. Also, in the dashboard, an instrument panel 150 may be provided to display the speed of the vehicle 100, the revolutions per minute (RPM) of the engine, the amount of remaining fuel, etc. The instrument panel 150 may include an instrument panel display 151 to display information related to the state and driving of the vehicle 100, information related to manipulations of the multimedia system, etc.

The driver may manipulate the above-described various devices installed in the dashboard to drive the vehicle 100.

A description about a communication portion included in the vehicle 100 will be replaced by the above description about the communication portion 520. If a controller 540-1 of the first vehicle C1 senses another vehicle (hereinafter, referred to as the non-connected vehicle C3 (i.e., "third vehicle")) that cannot communicate with the server 600, among other vehicles traveling around the vehicle 100, through a sensor 500-1 (①), the controller 540-1 may control a communication portion 520-1 to transmit a sensing signal for the non-connected vehicle C3 to the server 600 (②), as shown in FIG. 5. For autonomous driving of vehicles, the server 600 may need to collect information about vehicles or obstacles on roads. Accordingly, if connected vehicles sense information about the non-connected vehicle C3 or an obstacle, the connected vehicles may transmit the sensed information to the server 600. Herein, the information about the non-connected vehicle C3 may include an identification number of the vehicle C3, the position of the vehicle C3, information about a driving lane of the vehicle C3, the speed of the vehicle C3, etc. Hereinafter, a connected vehicle that senses information about the non-connected vehicle C3 and transmits the sensed information to the server 600 will be referred to as the first vehicle C1.

If the sensing information about the non-connected vehicle C3 is transmitted to the server 600 from the communication portion 520-1 under the control of the controller 540-1, the server 600 may create a vehicle group including the first vehicle C1 and the non-connected vehicle C3, based on the received information and other collected information about a road link on which the first vehicle C1 and the non-connected vehicle C3 travel.

The server 600 may include a receiver 610 to receive the information about the non-connected vehicle C3 (i.e., "third vehicle") from the first vehicle C1, a transmitter 630 to transmit a message to the second vehicle C2, and a controller 620 to control the transmitter 630 to output the message if the information about the non-connected vehicle C3 is received by the receiver 610. If the information about the non-connected vehicle C3 transmitted from the first vehicle C1 is received by the receiver 610, the controller 620 may detect a connected vehicle (hereinafter, referred to as the second vehicle C2) that can sense the non-connected vehicle C3, from among the connected vehicles included in the vehicle group. The controller 620 of the server 600 may have stored information about the sensing ranges of sensors installed in the connected vehicles, in advance. Accordingly, the controller 620 of the server 600 may detect the second vehicle C2 that can sense the non-connected vehicle C3, based on the sensing ranges of the sensors installed in the connected vehicles included in the vehicle group.

If the second vehicle C2 that can sense the non-connected vehicle C3 is decided, the controller 620 of the server 600 may transmit a message indicating that it is unnecessary to transmit information about the non-connected vehicle C3, to the second vehicles C2, through the transmitter 630, in order to prevent the same one as the information about the non-connected vehicle C3 already collected from the first vehicle C1 from being redundantly transmitted from the second vehicle C2 (③). Also, the transmitter 630 of the server 600 may transmit the information about the non-connected vehicle C3 collected from the first vehicle C1 to the other connected vehicles included in the corresponding vehicle group so that the connected vehicles can share the information about the non-connected vehicle C3.

If a communication portion 520-2 of the second vehicle C2 receives the message transmitted from the server 600, a controller 540-2 of the second vehicle C2 may control the communication portion 520-2 so that sensing information about the non-connected vehicle C3 (i.e., "third vehicle") is not transmitted to the server 600. If the same information about the non-connected vehicle C3 is prevented from being redundantly transmitted, through the above-described method, it is possible to reduce data traffic, and to improve the data processing efficiency of the server 600.

FIG. 6 shows another example. As shown in FIG. 6, if the controller 540-1 of the first vehicle C1 senses a non-connected vehicle C3 traveling around the first vehicle C1 through the sensor 500-1 (①), the controller 540-1 may control the communication portion 520-1 to transmit a sensing signal for the non-connected vehicle C3 to the server 600 (②). Since the server 600 needs to collect information about vehicles or obstacles on roads for autonomous driving of vehicles, the connected vehicles may transmit, if acquiring information about the non-connected vehicle C3 or information about another obstacle, the information to the server 600.

After the information about the non-connected vehicle C3 is transmitted from the communication portion 520-1 to the server 600 under the control of the controller 540-1, the controller 540-1 of the first vehicle C1 may transmit a message indicating that information about the non-connected vehicle C3 has been transmitted to the server 600, to the second vehicle C2 traveling around the first vehicle C1 (③). That is, in the embodiment shown in FIG. 5, the server 600 may transmit the message to the second vehicle C2 to prevent information about the non-connected vehicle C3 from being redundantly collected, whereas in the embodiment shown in FIG. 6, the first vehicle C1 may transmit the message to the second vehicle C2 to prevent information about the non-connected vehicle C3 from being redundantly transmitted. As described above, the communication portions 520-1 and 520-2 of the first and second vehicles C1 and C2 may include a communication module (for example, a Wi-Fi module) capable of performing Vehicle-to-Vehicle (V2V) communication. Accordingly, the first vehicle C1 can transmit the message to the second vehicle C2 through direct communication with the second vehicle C2, not via the server 600.

The first vehicle C1 may have stored information about a vehicle group including the first vehicle C1 and the non-connected vehicle C3 (i.e., "third vehicle"), received from the server 600, in advance, or may receive the information about the vehicle group in real time from the server 600, to detect the second vehicle C2. If the message transmitted from the first vehicle C1 is received by the communication portion 520-2 of the second vehicle C2, the controller 540-2 of the second vehicle C2 may determine whether information sensed in real-time by the sensor 500-2 of the second vehicle C2 is identical to the information about the non-connected vehicle C3 sensed by the first vehicle C1. If the controller 540-2 of the second vehicle C2 determines that the information sensed by the sensor 500-2 of the second vehicle C2 is identical to the information about the non-connected vehicle C3 sensed by the first vehicle C1, the controller 540-2 may transmit no information sensed by the sensor 500-2 to the server 600, and if the controller 540-2 of the second vehicle C2 determines that the information sensed by the sensor 500-2 of the second vehicle C2 is not identical to the information about the non-connected vehicle C3 sensed by the first vehicle C1, the controller 540-2 may control the communication portion 520-2 to transmit the information to the server 600. If the server 600 receives information that is different from the information sensed by the first vehicle C1, from the second vehicle C2, the server 600 may transmit the received information to the other connected vehicles included in the vehicle group in order to share the information with the other connected vehicles.

The embodiments shown in FIGS. 5 and 6 may be implemented independently or in combination. For example, if the second vehicle C2 receives a message indicating that it is unnecessary to transmit information about the non-connected vehicle C3, from any one of the first vehicle C1 and the server 600, the second vehicle C2 may transmit no information about the non-connected vehicle C3 to the server 600.

If the information about the non-connected vehicle C3 (i.e., "third vehicle") is prevented from being redundantly collected, through the above-described method, it is possible to reduce data traffic, and to improve the data processing efficiency of the server 600.

According to the technical solution as described above, it is possible to reduce data usage, and to lower communication costs.

Although select embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A server comprising:
a receiver configured to receive information, from a first vehicle, indicating that a third vehicle is unable to communicate with the server; and
a transmitter configured to transmit a message, to a second vehicle that is able to sense the third vehicle, indicating that it is unnecessary to transmit information about the third vehicle, in response to the receiver receiving the information indicating that the third vehicle is unable to communicate with the server,
wherein the transmission of the message to the second vehicle prevents information about the third vehicle from being redundantly collected.

2. The server according to claim 1, further comprising:
a controller configured to detect the second vehicle around the third vehicle based on position information of the third vehicle transmitted from the first vehicle and to control the transmitter to transmit the message to the second vehicle.

3. The server according to claim 2, wherein the controller is further configured to store information about a sensing range of a sensor of the first vehicle and information about a sensing range of a sensor of the second vehicle.

4. A system comprising:
a server including a receiver and a transmitter;
a first vehicle configured to sense a third vehicle that is unable to communicate with the server and to transmit information, to the server, indicating that the third vehicle is unable to communicate with the server; and
a second vehicle configured to sense the third vehicle, wherein
the server is configured to transmit a message, to the second vehicle, indicating that it is unnecessary to transmit information about the third vehicle, in response to the server receiving the information indicating that the third vehicle is unable to communicate with the server,
the second vehicle is further configured to prevent sensing information about the third vehicle from being transmitted to the server in response to receiving the message from the server, and
the transmission of the message to the second vehicle prevents information about the third vehicle from being redundantly collected.

5. The system according to claim 4, wherein the first vehicle is further configured to transmit a message, to the second vehicle, indicating that the information indicating that third vehicle is unable to communicate with the server has been transmitted to the server.

6. The system according to claim 4, wherein, when the information transmitted from the first vehicle is received at the server, the second vehicle is further configured to prevent the sensing information about the third vehicle from being transmitted to the server.

7. The system according to claim 4, wherein the server is further configured to detect the second vehicle around the third vehicle based on position information of the third vehicle transmitted from the first vehicle.

8. The system according to claim 4, wherein each of the first vehicle and the second vehicle includes a sensor configured to sense the third vehicle and to acquire information about the first vehicle or the second vehicle in which the sensor is included.

9. The system according to claim 8, wherein the sensor includes at least one of a distance sensor, an image sensor, a speed sensor, and a Global Positioning System (GPS) apparatus.

10. The system according to claim 4, wherein each of the first vehicle and the second vehicle includes a communication portion configured to perform communication with the server and Vehicle-to-Vehicle (V2V) communication.

11. A system comprising:
a first vehicle configured to sense a third vehicle that is unable to communicate with a server, to transmit information about the third vehicle to the server, and to transmit a message indicating that the information about the third vehicle has been transmitted to the server; and
a second vehicle configured to sense the third vehicle, to receive the message transmitted from the first vehicle, and to prevent sensing information about the third vehicle from being transmitted to the server in response to receiving the message from the first vehicle,
wherein the transmission of the message to the second vehicle prevents information about the third vehicle from being redundantly collected.

12. The system according to claim 11, further comprising:
a server configured to transmit a message, to the second vehicle, indicating that it is unnecessary to transmit information about the third vehicle in response to receiving the information about the third vehicle from the first vehicle.

13. The system according to claim 12, wherein the second vehicle is further configured to prevent the sensing information about the third vehicle from being transmitted to the server in response to receiving the message from the server.

14. The system according to claim 12, wherein the server is further configured to detect the second vehicle around the third vehicle based on position information of the third vehicle transmitted from the first vehicle.

15. The system according to claim 11, wherein each of the first vehicle and the second vehicle includes a sensor configured to sense the third vehicle and to acquire information about the first vehicle or the second vehicle in which the sensor is included.

16. The system according to claim 11, wherein each of the first vehicle and the second vehicle includes a communication portion configured to perform communication with the server and Vehicle-to-Vehicle (V2V) communication.

* * * * *